March 17, 1931.  L. M. MONTGOMERY  1,797,012
HEADLIGHT LENS
Filed Aug. 11, 1928  2 Sheets-Sheet 1
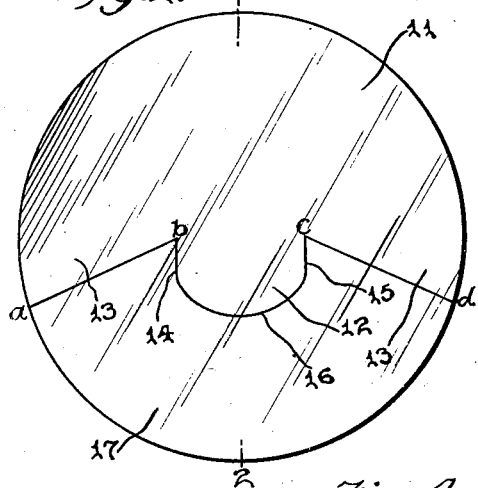
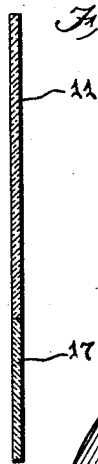
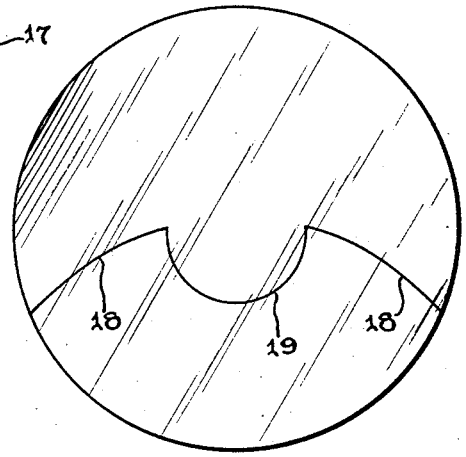
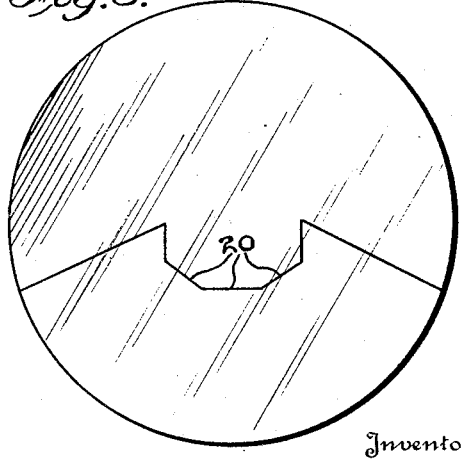
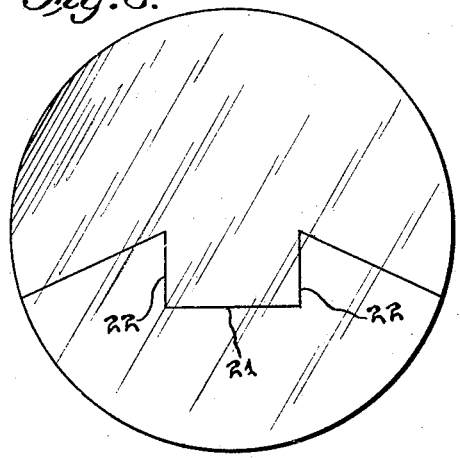
Inventor
Leon M. Montgomery,
By
Attorney March 17, 1931. L. M. MONTGOMERY 1,797,012
HEADLIGHT LENS
Filed Aug. 11, 1928 2 Sheets-Sheet 2
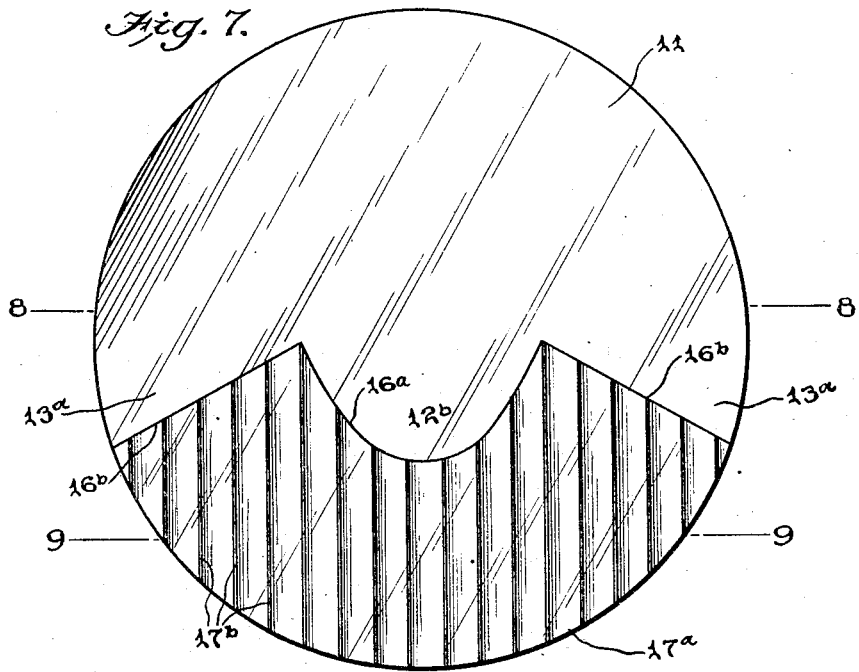
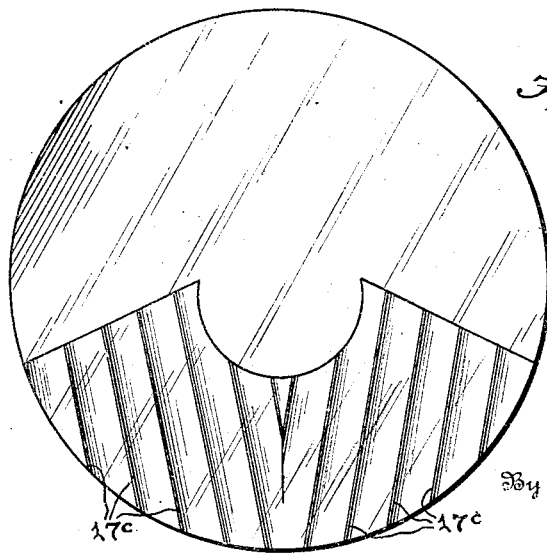
Inventor
Leon M. Montgomery,
By
Attorney Patented Mar. 17, 1931

1,797,012

UNITED STATES PATENT OFFICE

LEON M. MONTGOMERY, OF MONTGOMERY, ALABAMA

HEADLIGHT LENS

Application filed August 11, 1928. Serial No. 299,035.

This invention relates to improvements in automobile headlights, and more particularly to novel means to be arranged at the forward portion of a headlight casing to intercept upwardly and laterally directed light rays, and to diffuse and spread downwardly and forwardly directed rays, for the purpose of flooding the roadway forward of the vehicle with light, while preventing the light rays from reaching the eyes of the operators of approaching vehicles.

The primary object of the invention is to provide a lens plate, including an upper light intercepting portion for intercepting the passage of light through the upper half of the plate, said portion also extending into the lower half and having in the lower half, a central tab and side wings which intercept the central and upwardly directed side rays. The portion of the lower half of the plate below the light intercepting portion being formed of transparent glass, in order that rays passing from the lower portion of the lamp will light the roadway forwardly and laterally of the path of the vehicle.

Another object of the invention is to provide a non-glaring headlight lens plate of simple and inexpensive construction. The light intercepting portion of the lens plate may take a number of forms, while still accomplishing the desired result, and the transparent lower portion of the plate may be provided with corrugations or rigs, either arranged vertically or inclined, for the purpose of diffusing and spreading laterally the lower half of the light beam upon the road ahead of the machine.

With the foregoing objects outlined and with other objects in view which will appear as the description proceeds, my invention consists in the novel features hereinafter described in detail, illustrated in the accompanying drawings, and more particularly pointed out in the appended claim.

Referring to the drawings,

Fig. 1 is a front view of one of the simplest forms of a lens plate made in accordance with the preesnt invention.

Fig. 2 is a vertical sectional view of the same.

Figs. 3, 4, 5 and 6 are front views of other forms of the invention on a reduced scale.

Fig. 7 is a front view of what I now consider the preferred embodiment of the invention.

Fig. 8 is a horizontal sectional view of the same taken on line 8—8 of Fig. 7.

Fig. 9 is a similar view taken on line 9—9 of Fig. 7.

Fig. 10 is a view of a modification somewhat similar to the device shown in Fig. 7, but in which the corrugations converge downwardly.

The plate forming the subject matter of this invention, is to be placed in the same location as the lens now generally used with headlights, that is, at the front of a casing containing a parabolic reflector in which there is a source of light. As shown in Figs. 1 and 2, the upper portion 11 of this plate is of semi-circular shape and provided at its lower portion with a depending centrally disposed tab or tongue 12, and side wings 13, the parts 11, 12 and 13 may be made of semi-opaque, semi-transparent, opaque, translucent, colored, frosted, or opal glass or any translucent material of any suitable character, but I prefer to make the same of translucent glass of proper thickness to soften, diffuse or so modify the light rays that they will not glare.

In Fig. 1, the lines (a), (b), and (c), (d) which define the lower edges of the wings, converge toward the central portion of the plate, and the side edges 14 and 15 of the tab may be parallel and merge at their upper ends into the edges of the wings, and at their lower ends into the curved edge 16 of the tab.

The wings may drop to any desired degree, but I prefer to drop them so that their lower edges will be about twelve and one-half degrees relatively to the horizontal.

The lower portion 17 of the plate is formed of transparent glass in order that the lower portion of the light beam may be directed forwardly and downwardly on to the road in front of the vehicle.

When a lens plate of this character is applied to a head lamp, the upper parts 11, 12, 13 will intercept the light rays that normally blind, dazzle and glare. The wings 13 will prevent side glare, and when the lamp is properly adjusted at 75 feet, the rays from the section 17 will not be over 40 inches above the ground.

At this point, it may be stated that the lens may be flat or curved, and furthermore, the parts 11, 12 and 13 might be a metal plate placed against a sheet of glass of which the portion 17 is a part.

In the form of the invention shown in Fig. 3, the lower edge lines of the wings and central tab are curved, as shown at 18 and 19, but otherwise, the construction is similar to that shown in Figs. 1 and 2.

Fig. 4 shows a construction similar to that of Figs. 1 and 2, but in Fig. 4, the side edges of the tab converge downwardly as shown at 19.

The form of the invention illustrated in Fig. 5 differs from that in Fig. 1, by having the lower edge of the central tab cut on angular lines 20, instead of on a curved line.

In the modification shown in Fig. 6, the lower edge 21 of the central tab is arranged at right angles to its side edges.

Each of the modifications of the invention shown in Figs. 1 to 6 inclusive are preferably provided with a lower transparent portion having sets of downwardly convergent light spreading flutes as shown in Figs. 9 and 10.

In the form of the invention shown in Figs. 7, 8 and 9, the light intercepting part 11a is preferably formed of opalescent translucent glass, and the part 17a is formed of transparent glass having relatively wide vertically disposed concave flutes 17b on its inner side which function to disperse or spread the rays emanating from the transparent portion of the lens plate, forwardly and laterally of the vehicle. In this form of the invention, the line 16a between the transparent and translucent portion of the lamp, is of semi-elliptical shape, and the lines 16b defining the lower edges of the wings 13a, diverge downwardly.

It will be obvious that the tab 12b in this instance will intercept the central portion of the light beam, while the wings 13a will intercept some of the side portions of the beam. On the other hand, the clear part 17a will freely transmit the light rays and spread the same forwardly and laterally.

Instead of arranging the flutes vertically, they may be inclined as shown at 17c in Fig. 10.

The lens plate forming the present invention may, of course, be made of any desired thickness, and of suitable diameter to accommodate headlights of different sizes, and in operation, the upper or light intercepting portion of the plate will function to intercept the light rays which are normally directed upwardly and laterally, into the eyes of the operators of approaching vehicles.

Due to the side wing portions of the light intercepting part, the rays normally passing out at this portion of the lens will be intercepted, and when the lights are properly adjusted, the rays from the lower transparent section will not be over a predetermined distance above the ground.

From the foregoing, it is believed that the construction, operation and advantages of the invention may be readily understood, and I am aware that changes may be made in the details disclosed without departing from the spirit of the invention, as expressed in the claim.

What I claim and desire to secure by Letters Patent is:

A front plate for a headlight comprising an upper light intercepting portion and a lower transparent portion, the upper portion being formed of translucent glass for intercepting the passage of light rays through the upper portion of the plate, and extending into the lower half a substantial distance to form a central depending tab and downwardly directed divergent side wings, the transparent portion of the plate being formed of transparent glass provided with two sets of parallel light spreading flutes of equal width, the two sets of flutes being in downward convergent relation and of a substantial inclination with respect to each other and merging at the vertical center line of the plate, and the central flute of each set merging into each other at the bottom of the plate to form a common concavity.

In testimony whereof I affix my signature.

LEON M. MONTGOMERY.